(No Model.)
C. J. NEEF.
MOTOR.
No. 472,906. Patented Apr. 12, 1892.
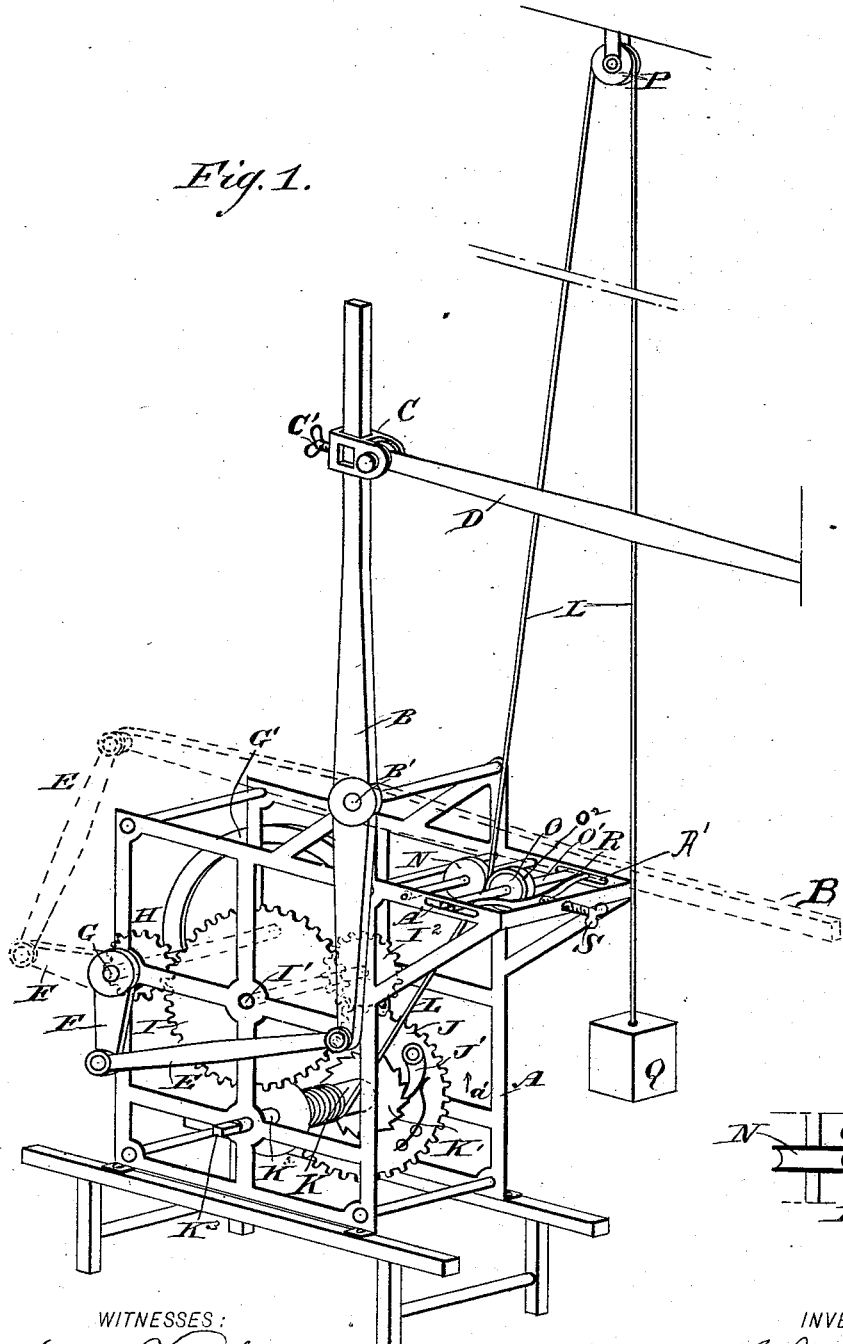
WITNESSES:
Donn Twitchell
C. Sedgwick
INVENTOR:
C. J. Neef
BY Munn & Co.
ATTORNEYS

UNITED STATES PATENT OFFICE.

CHARLES J. NEEF, OF TEXARKANA, ARKANSAS.

MOTOR.

SPECIFICATION forming part of Letters Patent No. 472,906, dated April 12, 1892.

Application filed December 26, 1891. Serial No. 416,255. (No model.)

*To all whom it may concern:*

Be it known that I, CHARLES J. NEEF, of Texarkana, in the county of Miller and State of Arkansas, have invented a new and Improved Motor, of which the following is a full, clear, and exact description.

The object of the invention is to provide a new and improved motor which is simple and durable in construction, very effective in operation, and more especially designed for driving small machinery, such as sewing-machines, pumps, churns, and the like.

The invention consists of certain parts and details and combinations of the same, as will be hereinafter described, and pointed out in the claims.

Reference is to be had to the accompanying drawings, forming a part of this specification, in which similar letters of reference indicate corresponding parts in both the figures.

Figure 1 is a perspective view of the improvement, and Fig. 2 is a plan view of the stopping mechanism with parts in section.

The improved motor is mounted on a suitably-constructed frame A, on which is pivoted at B' a lever B, carrying at one end an adjustable sleeve C, adapted to be secured in place by a set-screw C' or other suitable means. This adjustable sleeve C is pivotally connected with a pitman or link D, connected with the machine to be driven. The sleeve C is open transversely to change the position of the sleeve to make horizontal connection by the pitman D with the machine to be driven. The end of the lever B opposite the sleeve C is pivotally connected by a link E with a crank-arm F, secured on a shaft G, mounted to turn in suitable bearings in the frame A and carrying a fly-wheel G'. On the shaft G is secured a pinion H, in mesh with a large gear-wheel I, secured on a shaft I', also mounted to turn in suitable bearings in the frame A.

On the shaft I' is secured a pinion I², in mesh with a loose gear-wheel J, carrying on one face a spring-pressed pawl J', engaging a ratchet-wheel K', secured on the hoisting-drum K, the shaft K² of which is journaled in the main frame A, and on which shaft turns loosely the gear-wheel J. One outer end K³ of the shaft K² is square for applying a wrench or crank-arm to turn the hoisting-drum K to wind up the rope L on the said drum. The rope L extends from the hoisting-drum K upward and passes between two rollers N and O, and then extends to a pulley P, secured on the ceiling or other convenient place in the room or building in which the motor is located. The rope L, after passing over the pulley P, hangs downward, and the downward end carries a suitable weight Q. Of the two wheels N and O the wheel N is journaled in stationary bearings in the frame A, while the shaft O' of the other pulley is mounted in longitudinal slots A', formed in the sides of the frame A, as plainly shown in Fig. 1. A brake-beam R extends with its ends in the slots A' to bear against that side of the shaft O' opposite the shaft of the pulley N, the brake-beam R being hung on a screw-rod S, screwing in a cross-beam of the frame A. The pulley N is grooved, as plainly illustrated in Fig. 2, while the rim O² of the pulley O is made of rubber and flat to press the rope L against the pulley N, so as to clamp the rope to hold the same in a fixed position to stop the machine whenever desired. By screwing the screw-rod S outward the pressure on the shaft O' of the pulley O is released and the rope L can readily pass between the said two rollers N and O, which thus form a guide for the same. As shown and described, the lever B is arranged in a vertical position; but when it is desired to use the lever in a horizontal position then the position of the lever, link E, and crank-arm F is changed, as indicated in dotted lines in Fig. 1.

The operation is as follows: In order to actuate the motor, the operator turns the hoisting-drum K so as to wind up the rope L until the weight Q is in an uppermost position. The weight Q now exerts a pull on the rope L, so as to turn the hoisting-drum K in an opposite direction, the ratchet-wheel K' of the hoisting-drum carrying around the pawl J', so that the gear-wheel J is rotated in the direction of the arrow $a'$. This rotary motion of the gear-wheel J rotates the pinion I² of the shaft I', so that the gear-wheel I of the latter rotates and imparts a like motion to the pinion H, secured on the shaft G. The rotary motion of the latter causes swinging of the crank-arm F, whereby a like motion is imparted to the lever B by the link E, connecting the said lever B with the crank-arm F. The upper end of the lever B thus swings forward and backward, thereby imparting by the link or pitman D motion to the machine to be driven. By changing the position of the sleeve C nearer to or farther from the pivot B' less or more stroke is given to the pitman D, and consequently to the machine to be driven. When it is desired to impart to the free end of the lever B an up-and-down swinging motion, then the position of the said lever B and link E is changed, as indicated in dotted lines in Fig. 1.

When it is desired to reduce the speed of the machine, the operator screws up the screw-rod S, so as to brake the shaft O' by means of the cross-pieces R. When it is desired to completely stop the machine, the operator still farther screws up the screw-rod S, so as to securely clamp the rope L between the two pulleys N and O. It will thus be seen that by this device any desired speed can be given to the lever B, and consequently to the machine to be driven, or the entire motor may be conveniently stopped whenever desired.

Having thus fully described my invention, I claim as new and desire to secure by Letters Patent—

1. A motor comprising the frame, a clock mechanism thereon, a horizontal shaft G, driven therefrom and having a crank-arm F, a lever B, pivoted between its ends to the frame in a higher plane than shaft G to rock vertically, and a link E, connecting the short arm of the lever with the crank, the lever being adapted to operate in a vertical or horizontal position, substantially as shown and described.

2. The combination of the frame having an extension at one end, the sides of which are provided with slots, two parallel shafts, one of which at its ends enters said slots, pulleys mounted on said shafts, a brake-beam sliding at its ends in said slots, and a set-screw bearing on the center of said bar to cause it to press the loosely-mounted shaft toward the other shaft, with the clock mechanism mounted on the frame and having an operating-cord extending upwardly between the two pulleys over a guide-pulley and provided with a weight, substantially as set forth.

3. In a motor, the combination, with a rope carrying a weight and passing over a pulley, of a hoisting-drum on which winds the said rope, two pulleys between which passes said rope and of which one is grooved and the other provided with a flat rim, and a brake-beam engaging the shaft of the pulley having the flat rim, substantially as shown and described.

4. In a motor, the combination, with a rope carrying a weight and passing over a pulley and a hoisting-drum on which winds the said rope, of two pulleys N O, between which passes the rope between its weight and guide-pulley, the pulley N being grooved and the pulley O flat, the shaft O' of the flat pulley O being movable toward and from the grooved pulley, a sliding brake-beam engaging the shaft O' at opposite sides of pulley O, and the screw S, mounted in the frame and engaging the center of the brake-beam, substantially as set forth.

CHARLES J. NEEF.

Witnesses:
G. A. HAYS,
JOHN N. COOK.